W. T. HENSLEY.
DYNAMO ELECTRIC MACHINE.
APPLICATION FILED MAY 23, 1911.

1,255,606.

Patented Feb. 5, 1918.
5 SHEETS—SHEET 2.

W. T. HENSLEY.
DYNAMO ELECTRIC MACHINE.
APPLICATION FILED MAY 23, 1911.
1,255,606.
Patented Feb. 5, 1918.
5 SHEETS—SHEET 3.
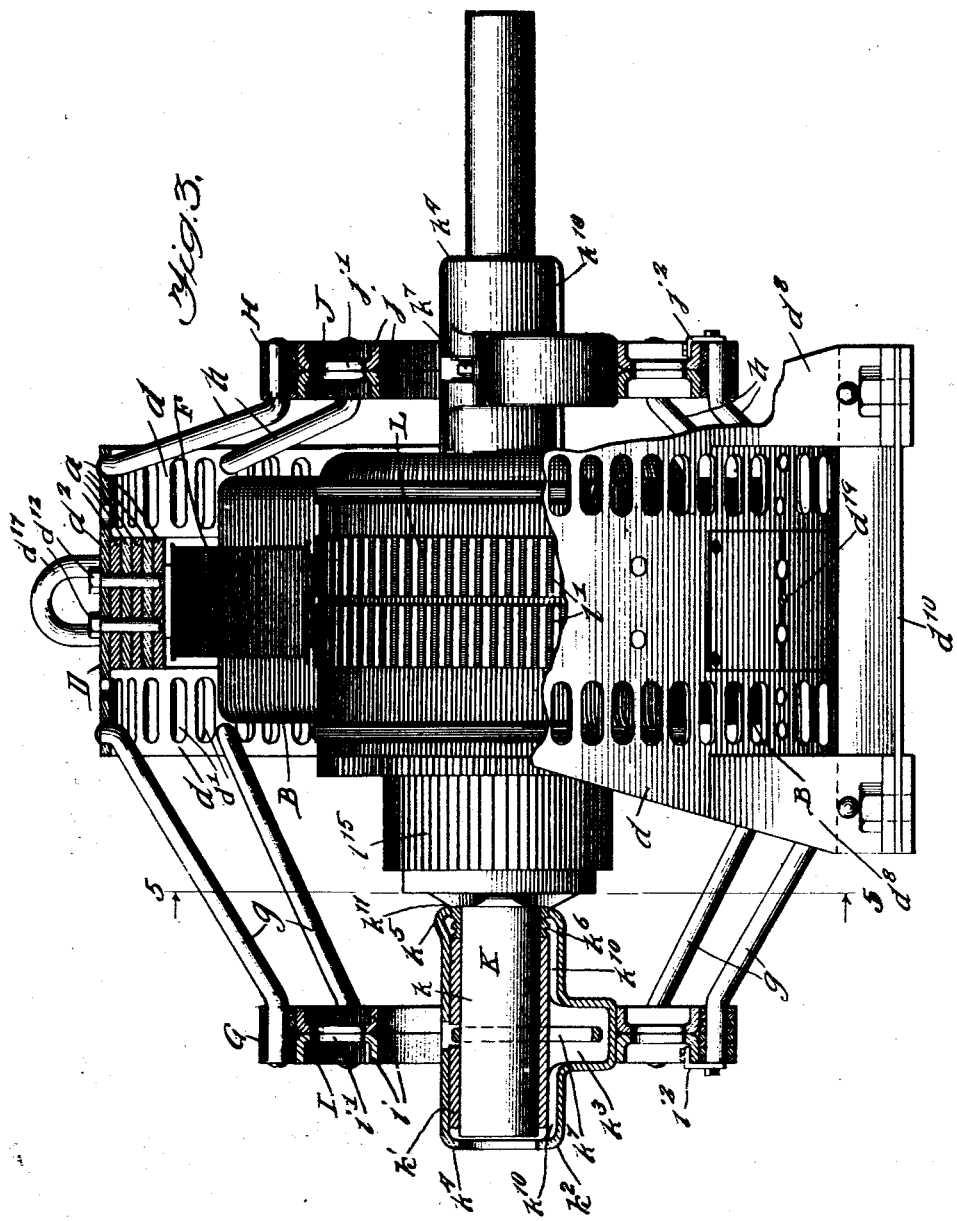

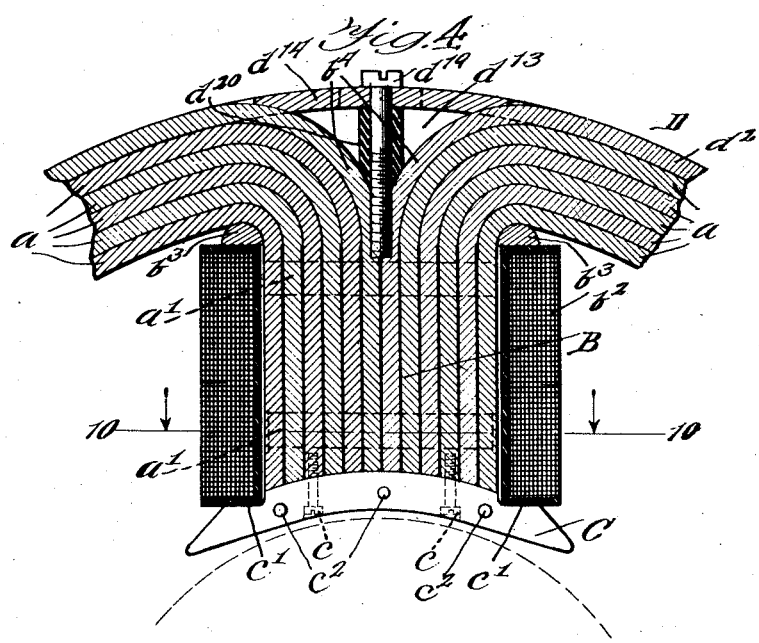
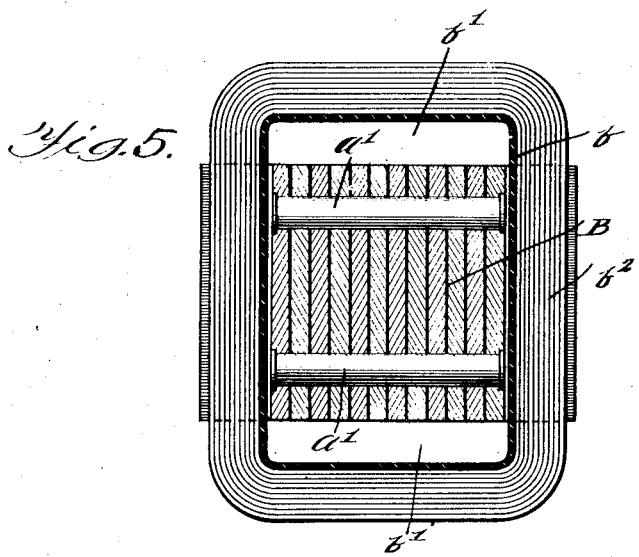

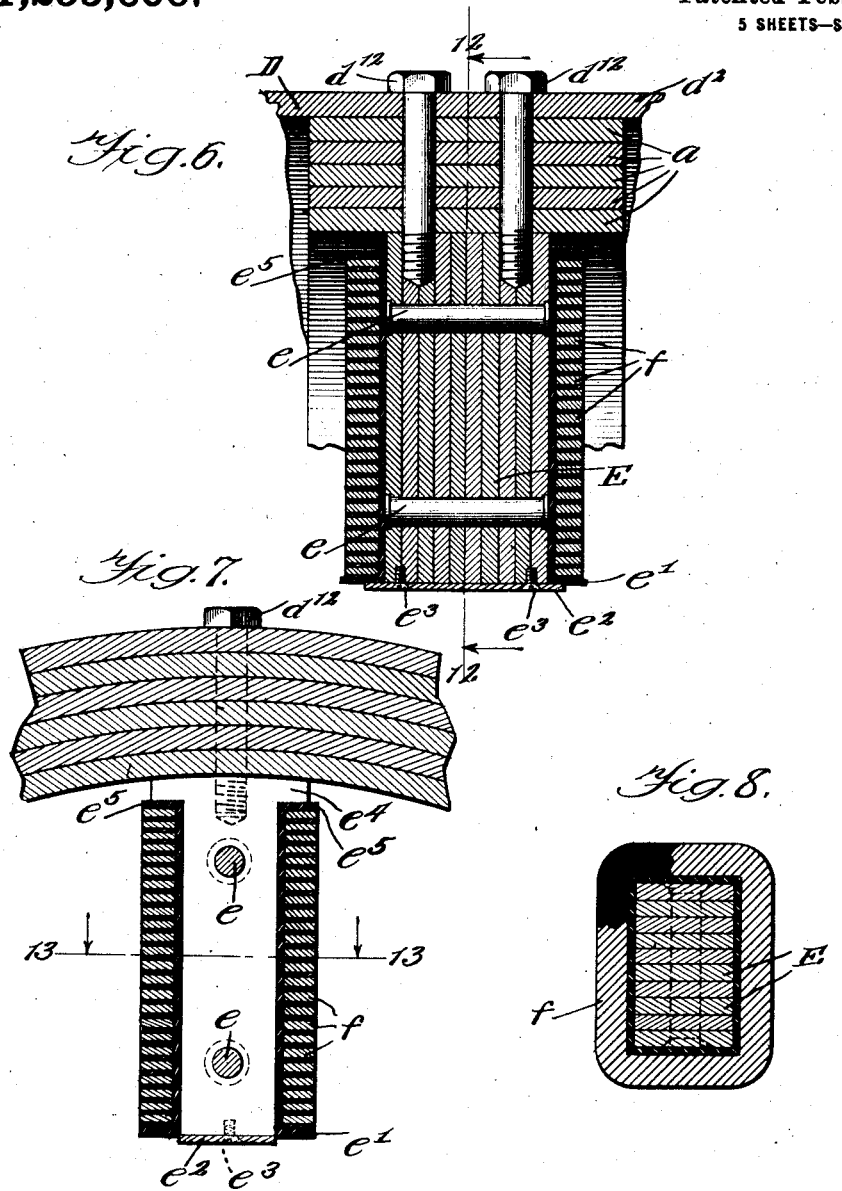

UNITED STATES PATENT OFFICE.

WILLIAM T. HENSLEY, OF CONNERSVILLE, INDIANA, ASSIGNOR, BY MESNE ASSIGNMENTS, TO BOUND BROOK ENGINE & MFG. CO., A CORPORATION OF DELAWARE.

DYNAMO-ELECTRIC MACHINE.

1,255,606.     Specification of Letters Patent.    Patented Feb. 5, 1918.

Application filed May 23, 1911. Serial No. 628,904.

*To all whom it may concern:*

Be it known that I, WILLIAM T. HENSLEY, a citizen of the United States of America, and resident of Connersville, Fayette county, Indiana, have invented a certain new and useful Improvement in Dynamo-Electric Machines, of which the following is a specification.

My invention relates to dynamo electric machines which can be used either as motors or dynamos. These have been made in various ways, a common form thereof involving a ring-like field or body having four equidistant main poles, and four commutating or so-called inter poles alternating therewith. In this well known form of dynamo machine, the armature is provided with a shaft which is supported in bracket bearings secured to the field or body of the machine, there being four brushes for the commutator of the armature, which brushes are disposed opposite the main poles of the field. In some cases the field and the armature core have been of a laminated character, and various methods have been proposed for reducing the cost of manufacture.

Generally stated, the object of my invention is to provide an improved construction and arrangement whereby the cost of production of a dynamo electric machine may be still further reduced, without in any way impairing the quality thereof, it being also my object, moreover, to materially increase the serviceability of this general type of dynamo electric machine, by eliminating certain objectionable features or characteristics heretofore employed, and whereby the reduced cost of production may be accomplished by the introduction of new and labor saving expedients in shop practice, as well as by the use of cheaper materials and less quantity thereof than was heretofore the practice in the manufacture of machines of this character.

Certain special objects are to provide an improved laminated construction of the field; to provide an improved laminated construction of the main poles of the field; to provide an improved laminated construction of the commutating or so-called inter poles of the field; to provide an improved body frame construction; to provide an effective lifting ring or rings which will at the same time perform other useful purposes, such as serving as rivets for holding the field frame laminæ together; to provide effective, simple and rigid feet or supports for the casing or stationary part of the machine, by means of which the said machine may be fastened to either floor, wall or ceiling; to provide such plates or coverings for depressions in the frame or casing as will give the casing a smooth, cylindrical and pleasing appearance; to provide an improved general construction which will tend to insure a better circulation of the air through the machine while running than heretofore; to provide a general construction whereby practically all of the metal parts of the machine, with the exception of the shaft, bolts, rods, and certain other parts, may be made from sheet metal pressed into the desired form; and to provide certain details and features of improvement tending to increase the general efficiency of a dynamo electric machine of this particular character.

To the foregoing and other useful ends, my invention consists in matters hereinafter set forth and claimed.

In the accompanying drawings—

Fig. 3 is a view similar to Fig. 1, showing the upper portion of the field and bracket support construction, as well as one of the bearings or housings for the shaft, in vertical longitudinal section.

Fig. 4 is a detailed, sectional view, on an enlarged scale, taken on a vertical plane transverse of the axis of the machine, of one of the main poles of the field construction.

Fig. 5 is a horizontal section on line 10—10 in Fig. 4.

Fig. 6 is a section, on the same scale as Fig. 4, of one of the commutating or so-called inter poles of the field construction, the section being taken on a plane extending radially from the axis of the machine.

Fig. 7 is a vertical section on line 12—12 in Fig. 6.

Fig. 8 is a horizontal section on line 13—13 in Fig. 7.

Figure 1:
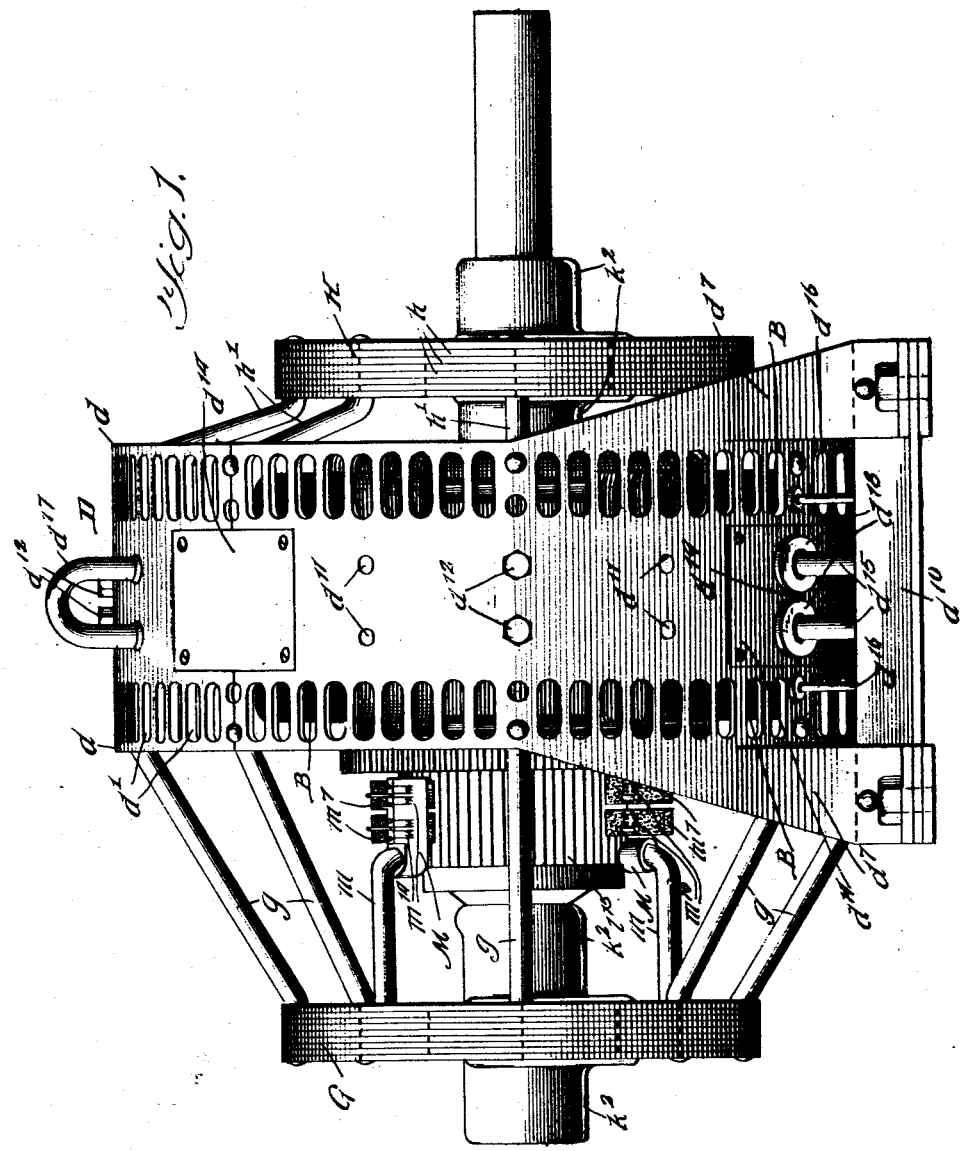
Figure 1 is a side elevation of a dynamo electric machine embodying the principles of my invention.
Figure 2:
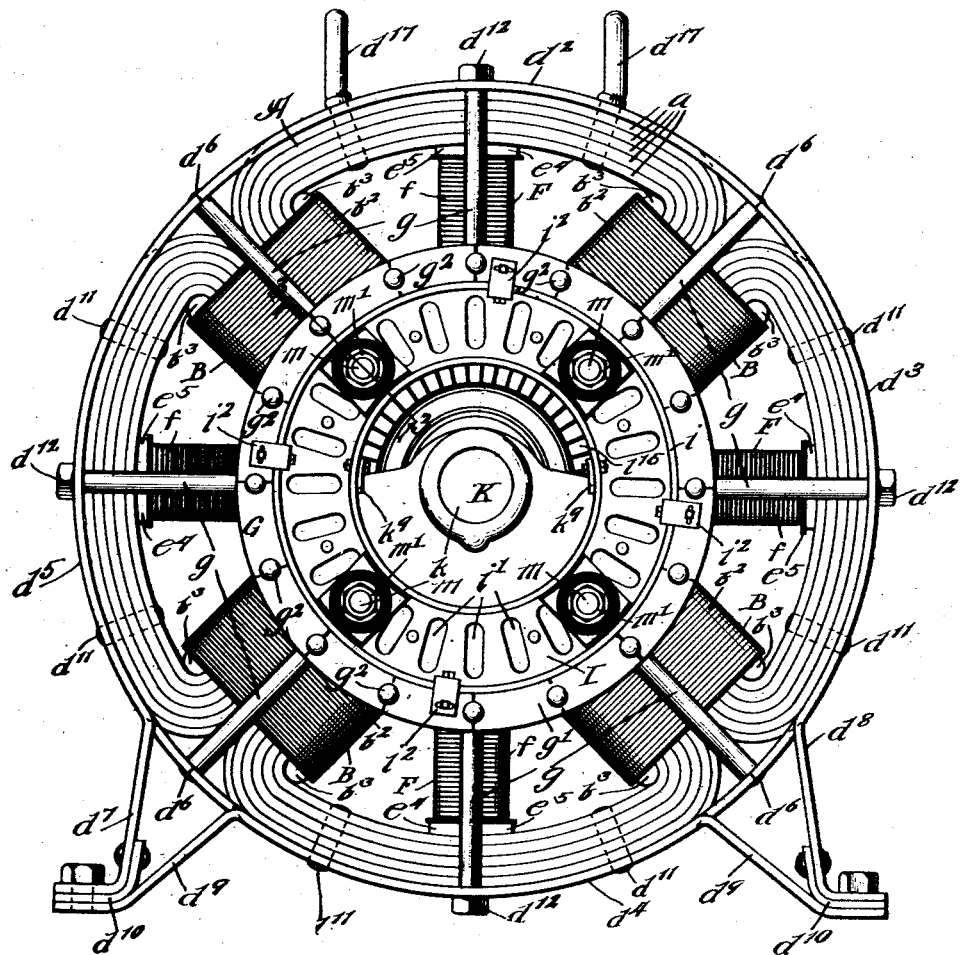
Fig. 2 is a front end elevation of the said machine.

As thus illustrated, and referring more particularly to Figs. 1, 2, and 3, it will be seen that my invention comprises a ring-like field or body frame construction A made in four sections. Each section of the field comprises a plurality of plates or sheet metal layers $a$, and where the sections meet, their laminated ends are bent inward and bound together by rivets or bolts $a'$ to provide a structure which, in effect, has the form of a rigid or continuous ring provided with four equidistant main poles B extending inwardly toward the axis of the machine. Thus the entire field construction is of a laminated character, the laminæ of the body of the field being concentric to the axis of rotation of the machine, and the laminæ of the main poles B, which are integral with the body of the field, and which are preferably separated by non-magnetic material, or by air gaps, being disposed in parallel planes which are parallel with the said axis of the machine, whereby each pole in its entirety is radial to the said axis. The advantage of this non-magnetic material, or of the air gaps, is that detrimental magnetic action is prevented or greatly reduced. The pole pieces C of the main poles are curved both outside and inside to follow the curvature of the armature, and are secured in place by screws which extend into certain of the layers or laminæ of the poles. Each pole B is preferably rectangular in cross section, as shown in Fig. 5, and is inclosed by a rectangular spool of insulation $b$ which is of a size and shape to provide spaces $b'$ between the inner surface thereof and the edges of the layers or laminæ of the poles. A coil or field winding $b^2$ is mounted on the said spool $b$, and may be of any suitable, known or approved character. Pieces of wood $b^3$ are preferably interposed between the outer end of the spool $b$ and the laminated field construction, these pieces of wood being curved to fit the bend or curvature of the laminæ. The coil or winding thus mounted, and the said pieces of wood $b^3$, are clamped upon the pole by the pole piece C, the latter having shoulders $c'$ which engage the outer end of the spool to crowd the latter outward toward the body of the field.

The ring-like field or frame thus constructed is secured to and inclosed by the cylindric sheet metal casing D which completely encircles the field, and which is provided at opposite sides with overhanging portions $d$ having openings or perforations $d'$ therein for air circulating purposes. The said casing D is composed of a plurality of sections or segments $d^2$, $d^3$, and $d^4$ and $d^5$, the ends of said sections or segments being provided with inner portions which are bent inward to form the two center layers or laminæ of the main poles B, as shown more clearly in Fig. 4, wherein it will be seen that the two center layers or laminæ $b^4$ are integral with the said cylindric casing. The flanges or overhanging portions $d$ are, however, of such character that they form a continuous circular flange at each side of the machine, the ends of the segments or sections of the casing coming together at the points $d^6$, where they may be welded or otherwise secured together, which points are equidistant apart and located opposite the main poles of the field. The sections $d^3$, $d^4$ and $d^5$ are preferably formed with portions $d^7$, $d^8$ and $d^9$, which portions are outside of the flanges or overhanging portions $d$. The portion $d^7$ is bent outwardly and riveted or bolted to one of the outwardly extending portions $d^9$, with a portion $d^{10}$ interposed between, thus forming a foot or attaching support for the machine. A similar foot or attaching support is formed by the bolting or riveting of the portion $d^8$ to the other portion $d^9$, and with the portion $d^{10}$ between, it being understood that the same construction is duplicated at the other side of the machine, whereby four feet or attaching supports are provided for the machine. Each portion $d^{10}$ is in effect an angle iron extending from a foot at the front of the machine to the corresponding foot at the rear end thereof, whereby the said feet or attaching supports are arranged in pairs, the members of each pair being rigidly connected by an angle plate or bar. The layers or laminæ of the ring-like field or body are secured together by radially disposed rivets $d^{11}$, which rivets are arranged at intervals in the circumference of the field. The structure of the field is also held together by the bolts $d^{12}$ that are inserted inwardly through the ring-like laminated structure and into the cores E of the commutating or so-called inter poles F, which latter are arranged to alternate with the main poles of the field. Each core E is composed of a plurality of plates or layers, being of a laminated character, which layers or plates are bound tightly together by the rivets $e$ extending transversely therethrough. A spool of insulation $e'$ is mounted on the rectangular core E, and is clamped in place by the plate $e^2$ which is secured to the end of the core E by screws $e^3$, in the manner shown in Fig. 6. The coil or winding $f$ may be of any suitable, known or approved character, and is supported on the spool $e'$ in the usual and well known manner. The tightening of the bolts or screws $d^{12}$ serves to draw the outer end of the core E against the inner face or surface of the field, and to thereby clamp the layers or laminæ of the field together. The said commutating or so-called inter poles F are, it will be seen, somewhat less in width than the width of the laminated outer portion of the field, whereby the field overhangs the said commutating poles at each side of the machine. The main field coils, however, as previously explained, are wider than the outer laminated portion of the field frame, whereby the spaces $b'$ are open at their outer and inner ends, the outer ends of these spaces being opposite the perforations $d'$ in the casing of the field, whereby a perfectly free circulation of the air is insured. The cavities $d^{13}$ formed by the inturned end portions of the sections or segments of the casing D are covered or concealed by plates $d^{14}$ which are secured to the casing in any suitable or desired manner. With this construction the terminals $d^{15}$ and $d^{16}$ of the machine may be conveniently brought through the lower portion of the casing, the terminals $d^{15}$ extending through one of the plates $d^{14}$, and the terminals $d^{16}$ extending through the overhanging portions or flanges $d$ of the said casing. At the upper portion of the field the rivets $d^{11}$ take the form of U-bolts or rivets $d^{17}$ which are disposed in vertical planes at opposite sides of the axis of the machine, which afford a convenient means for lifting or carrying the machine. The layers or laminæ of the commutating or inter poles F are disposed in parallel planes which extend crosswise of the axis of the machine. Thus the entire field or body construction is of a laminated character, it being made entirely of pressed sheet metal. A field of this character can be made at a comparatively low cost of production, and in use it has the advantage of being highly effective both mechanically and electrically.

The bracket rings G and H are disposed respectively at the front and rear ends of the machine, the former some distance away from the field, and the latter quite close thereto, each ring being concentric to the axis of the machine. The ring G is supported by bracket rods $g$ which have their outer ends suitably secured to one of the flanges $d$ of the field. The outer ends of the rods $g$ are bent to extend parallel with the axis of the machine, and these bent portions are forced through openings in the ring G and upset or welded, if necessary, on their outer ends. The ring G is laminated in character, being composed of a plurality of rings or layers $g'$ disposed in parallel planes extending crosswise of the axis of the machine. These layers or laminæ $g'$ are held together by the end portions of the rods $g$, and also by the rivets or rods $g^2$. The ring H is of a similar laminated construction, being composed of a plurality of flat rings $h$ which are held together by the end portions of the bracket rods $h'$, and by rivets or rods similar to the rivets or rods $g^2$, which rods $h'$ have their outer ends suitably secured to the other flange $d$ of the field. The rocker rings I and J are alike in construction, and are arranged respectively within the rings G and H, being adapted to rotate therein. The ring I is composed of two pressed sheet metal rings $i$ that are U-shaped in cross section, these two rings being secured back to back by rivets or other suitable devices, and being provided with apertures $i'$ to reduce weight and afford free circulation of the air. The ring J is composed of two similar pressed sheet metal rings $j'$, which are arranged back to back, and which are provided with apertures $j'$ to reduce the weight and permit free circulation of the air. The ring I is, when properly adjusted within the ring G, properly held in place by clips or clamping pieces $i^2$ secured to the rings G and adapted to engage the outer flange of the ring I, whereby the latter may be adjusted at will and retained in any desired position. Similar clips or clamping pieces $j^2$ are employed for securing the ring J against movement within the ring H, after the parts have been properly adjusted to suit the requirements of any particular case.

The shaft K has reduced end portions $k$ that are supported in bearings $k'$, these bearings in turn being supported by and inclosed within the pressed sheet metal housings $k^2$. Each housing is made from a single sheet metal blank pressed into shape to provide an oil well $k^3$, an inturned lip or flange $k^4$ at the outer end of the housing, and a bead or rib $k^5$ at the inner end, which latter provides an annular groove for the usual oil thrower $k^6$ resting against a shoulder $k^{11}$ on the shaft. The oil ring $k^7$ hangs on the shaft and revolves in the oil well or reservoir $k^3$ in the usual and well known manner. The bottom wall of the chamber or reservoir $k^3$ rests on the ring G, as shown more clearly in Fig. 2, and is held in place by clips or fastening devices $k^9$ which are secured to the inner flange of the ring I, whereby rotary adjustment of the shaft housing is easily accomplished to properly position the same. The said housing $k^2$ is provided at the bottom thereof with longitudinal channels $k^{10}$ that communicate with the chamber $k^3$, to insure proper lubrication. It will be understood that the housing and shaft bearing at the other end of the machine are of exactly the same character as the ones just described.

The armature core L is of a laminated character, being divided into two sections. The coils or windings of the armature are connected in any suitable or well known manner with the segments or sections of the commutator.

The commutator comprises segments or sections $l^{15}$, which are insulated from each other in the usual and well known manner.

The brush holders M, four in number, are each disposed opposite one of the main poles of the field magnet structure, and are mounted upon arms $m$ which are inserted through openings in the rocker ring I and secured in place by nuts $m'$, there being suitable bushings or washers of insulating material to prevent electrical connection between the arms $m$ and the structure of the machine. The carbon brushes $m^7$ and the sheet metal plates $m^{10}$ are slidably held in the brush holder M and are tightly pressed against the cylindrical surface of the commutator by the double coil spring $m^{14}$.

From the foregoing it will be seen that I provide a novel construction of dynamo electric machine in which practically all of the metal parts are made of pressed sheet metal. The entire field magnet construction, for example, can be made of sheet iron or steel pressed into the desired form to produce a laminated structure of exceptionally good value and strength, the cost of manufacture being much less than heretofore. The main and auxiliary poles are also, as explained, of laminated sheet iron or steel, and the armature core is constructed of a similar material. The plates or laminæ of the armature core are, however, quite thin, as compared with those of the main and auxiliary cores of the field magnets. The pole pieces or shoes C are each composed of very thin plates or laminæ secured together by transverse rivets $c^2$, the thickness of these plates being the same as those of the armature core, or of any suitable thickness, to prevent detrimental electrical action, as for example eddy currents in the pole face. The parts all go together nicely and with comparatively little labor, are easily taken apart and renewed, and involve the use of materials which are most easily obtainable and most easily worked into shape. The construction affords, therefore, considerable opportunity for the introduction of economical expedients of shop practice which are calculated to reduce the cost of production practically to a minimum. This is accomplished, however, without impairing the general quality of the machine, and in fact it is even possible to obtain by this method of construction a better quality than heretofore. As good or a better motor or dynamo at less cost is, therefore, the general and principal object of my invention.

The general principles and mode of operation of a dynamo electric machine of the foregoing character are well understood and need not be described. The circuits may, of course, be of any suitable, known or approved character. It is well known, for example, that the commutating or so-called inter poles F supply a counter-flux which tends to prevent sparking at the commutator. By reason of the laminated construction of the field, I find that better magnetic circuits are produced and that the action of the main poles is considerably improved. In other words, the laminated character of the field magnet construction tends not only toward a reduction in the cost of production, but serves also to insure a better and more effective machine. It will also be seen that the laminated cores E of the inter poles are formed with enlarged inner end portions $e^4$ which insure wide contact between the said core and the inner surface of the field. This improves the magnetic action and effect of the field construction as a whole, and provides shoulders $e^5$ against which the coils or windings $f$ are clamped by the plates $e^2$, in the manner previously described.

Referring to Figs. 1 and 4, the lower plate $d^{14}$ through which the terminals $d^{15}$ extend is made in two parts, being split or divided longitudinally of the machine at the center of the plate, so that the two edges of the two parts of the plate come together around the insulating bushings $d^{18}$ of the terminals $d^{15}$. A center screw $d^{19}$ extends between the two edges of the two parts of the plate, and into the field frame, passing through a long bushing or washer $d^{20}$, which latter supports the said two part plate $d^{14}$ to keep the latter from collapsing into the recess $d^{13}$ which it covers. Thus an effective arrangement is provided for securing the terminals in place on a stationary portion of the machine, and for locating the same in a position where they will be protected against injury.

What I claim as my invention is:—

1. In a rotary dynamo electric machine, a field magnet construction comprising a laminated body, said body being composed of a plurality of sections, the surfaces of the laminæ of each section being parallel with the axis of rotation of the machine, and the outer laminæ being wider than the others to provide a casing having overhanging flanges for the field, which flanges are apertured, and feet integral with said casing.

2. In a rotary dynamo electric machine, a field magnet construction comprising a laminated body, said body being composed of a plurality of sections, each section having the ends thereof turned inward to form the poles of the field, and means for solidly uniting said inturned ends, said sections thereby forming a rigid body frame, the laminæ of each section extending parallel with the axis of rotation of the machine, and inter poles of laminated construction, the laminæ of said inter poles being arranged in parallel planes extending crosswise of said axis.

3. In a rotary dynamo electric machine, a field magnet construction comprising a laminated body, said body being composed of a plurality of sections, each section having the ends thereof turned inward to form the poles of the field, and means for solidly uniting said inturned ends, said sections thereby forming a rigid body frame, the laminæ of each section extending parallel with the axis of rotation of the machine, each pole being composed of the inturned ends of two adjacent sections, the laminæ in the poles being disposed in parallel planes, the laminæ between the poles being arranged concentrically with respect to each other and said axis, and inter poles of laminated construction, the laminæ of said inter poles arranged in parallel planes extending crosswise of said axis.

4. In a rotary dynamo electric machine, a field magnet construction comprising a laminated body, said body being composed of a plurality of sections, each section having the ends thereof turned inward to form the poles of the field, and the surfaces of the laminæ of each section being parallel with the axis of rotation of the machine, the outer laminæ being wider than the others to provide a casing having overhanging flanges for the field, which flanges are apertured, and feet integral with said casing.

5. In a rotary dynamo electric machine, a field magnet construction comprising a laminated body, said body being composed of a plurality of sections, each section having the ends thereof turned inward to form the poles of the field, the surfaces of the laminæ of each section being parallel with the axis of rotation of the machine, each pole being composed of the inturned ends of two adjacent sections, the laminæ in the poles being disposed in parallel planes, and the laminæ between the poles being arranged concentrically with respect to each other and said axis, the outer laminæ being wider than the others to provide a casing having overhanging flanges for the field, which flanges are apertured, and feet integral with said casing.

6. In a rotary dynamo electric machine, a field magnet construction comprising a laminated body, said body being composed of a plurality of sections, each section having the ends thereof turned inward to form the poles of the field, and the surfaces of the laminæ of each section being parallel with the axis of rotation of the machine, the outer laminæ being wider than the others to provide a casing having overhanging flanges for the field, which flanges are apertured, feet integral with said casing, bracket rings, an armature shaft, means for supporting the shaft in said rings, and supporting rods connecting said rings with said flanges.

7. In a rotary dynamo electric machine, a field magnet construction comprising a laminated body, said body being composed of a plurality of sections, each section having the ends thereof turned inward to form the poles of the field, the surfaces of the laminæ of each section being parallel with the axis of rotation of the machine, each pole being composed of the inturned ends of two adjacent sections, the laminæ in the poles being disposed in parallel planes, and the laminæ between the poles being arranged concentrically with respect to each other and said axis, the outer laminæ being wider than the others to provide a casing having overhanging flanges for the field, which flanges are apertured, feet integral with said casing, bracket rings, an armature shaft, means for supporting the shaft in said rings, and supporting rods connecting said rings with said flanges.

8. In a rotary dynamo electric machine, a field magnet construction comprising a laminated body, said body being composed of a plurality of sections, each section having the ends thereof turned inward to form the poles of the field, the surfaces of the laminæ of each section being parallel with the axis of rotation of the machine, inter poles of laminated construction, the laminæ of said inter poles being arranged in parallel planes extending crosswise of said axis, each inter pole having the core thereof formed with an enlarged base which seats upon the inner surface of the said body, screws extending through said sections and into the said base of each inter pole, a winding for each inter pole, and a face plate secured to the end of each inter pole to secure the winding thereon.

9. In a rotary dynamo electric machine, a field magnet construction comprising a laminated body, said body being composed of a plurality of sections, each section having the ends thereof turned inward to form the poles of the field, the surfaces of the laminæ of each section being parallel with the axis of rotation of the machine, each pole being composed of the inturned ends of two adjacent sections, the laminæ in the poles being disposed in parallel planes, the laminæ between the poles being arranged concentrically with respect to each other and said axis, inter poles of laminated construction, the laminæ of said inter poles being arranged in parallel planes extending crosswise of said axis, each inter pole having the core thereof formed with an enlarged base which seats upon the inner surface of the said body, screws extending through said sections and into the said base of each inter pole, a winding for each inter pole, and a face plate secured to the end of each inter pole to secure the winding thereon.

10. In a rotary dynamo electric machine, a field magnet construction comprising a laminated body, said body being composed of a plurality of sections, each section having the ends thereof turned inward to form the poles of the field, the surfaces of the laminæ of each section being parallel with the axis of rotation of the machine, each pole being composed of the inturned ends of two adjacent sections, the laminæ in the poles being disposed in parallel planes, and the laminæ between the poles being arranged concentrically with respect to each other and said axis, a winding for each pole, there being space between the windings and the edges of the laminæ of the poles, pole pieces for the ends of said poles, to keep the windings in place thereon, and fastening screws extending through said pole pieces and into the said poles.

11. In a dynamo electric machine, a field structure having a sheet metal casing forming a part thereof, and feet integral with said casing, which feet are each formed by two portions of the sheet metal bent outwardly and fastened together at their ends.

12. In a dynamo electric machine, a field structure having a sheet metal casing forming a part thereof, feet integral with said casing, which feet are each formed by two portions of the sheet metal bent outwardly and fastened together at their ends, and angle iron bars connecting said feet together in pairs.

13. In a dynamo electric machine, a laminated field structure, the laminæ being concentric to each other, and U-shaped members the end portions of which are inserted through the field to hold the laminæ thereof together.

14. A dynamo electric machine comprising a field magnet construction forming the frame of the machine, said frame including a plurality of laminated sheet metal sections having end portions forming the poles of the field, an armature shaft, bearings for said shaft, means for uniting said end portions to complete the continuity of said field construction and insure rigidity of said frame, and means for supporting said bearings on said frame, the outer sheet metal layers of the sections combining to provide said frame with a cylindric casing.

Signed by me at Chicago, Illinois, this 19th day of May, 1911.

WILLIAM T. HENSLEY.

Witnesses:
  E. H. CLEGG,
  R. KEARNS.